(12) United States Patent
Su et al.

(10) Patent No.: US 7,942,523 B2
(45) Date of Patent: May 17, 2011

(54) METHOD FOR MANUFACTURING POLARIZED OPHTHALMIC LENSES

(75) Inventors: Kai C. Su, Alpharetta, GA (US); Patrick Culley, Alpharetta, GA (US); Hangtai Kai, Alpharetta, GA (US)

(73) Assignee: Qspex Technologies, Inc., Alpharetta, GA (US)

( * ) Notice: Subject to any disclaimer, the term of this patent is extended or adjusted under 35 U.S.C. 154(b) by 296 days.

(21) Appl. No.: 12/236,897

(22) Filed: Sep. 24, 2008

(65) Prior Publication Data
US 2009/0079934 A1 Mar. 26, 2009

Related U.S. Application Data

(60) Provisional application No. 60/974,515, filed on Sep. 24, 2007.

(51) Int. Cl.
*G02C 7/02* (2006.01)
*B29D 11/00* (2006.01)
*G02B 3/00* (2006.01)
(52) U.S. Cl. .................. 351/177; 264/1.1; 264/1.32
(58) Field of Classification Search .................. 351/177, 351/163; 264/1.1, 1.32
See application file for complete search history.

(56) References Cited

U.S. PATENT DOCUMENTS

| | | | |
|---|---|---|---|
| 3,833,289 A | 9/1974 | Schuler | |
| 3,940,304 A | 2/1976 | Schuler | |
| 4,090,830 A | 5/1978 | Laliberte | |
| 4,268,127 A | 5/1981 | Oshima et al. | |
| 4,274,717 A | 6/1981 | Davenport | |
| 4,418,992 A | 12/1983 | Davenport et al. | |
| 4,427,741 A | 1/1984 | Aizawa et al. | |
| 4,617,207 A | 10/1986 | Ueki et al. | |
| 4,873,029 A | 10/1989 | Blum | |
| 5,049,427 A | 9/1991 | Starzewski et al. | |
| 5,051,309 A | 9/1991 | Kawaki et al. | |
| 5,059,356 A | 10/1991 | Nakamura et al. | |
| 5,071,906 A | 12/1991 | Tanaka et al. | |
| 5,286,419 A | 2/1994 | van Ligten et al. | |
| 5,434,707 A | 7/1995 | Dalzell et al. | |
| 5,641,372 A | 6/1997 | Okuno | |
| 5,702,813 A | 12/1997 | Murata et al. | |
| 5,718,849 A | 2/1998 | Maus et al. | |
| 5,757,459 A | 5/1998 | Bhalakia et al. | |
| 5,800,744 A | 9/1998 | Munakata | |

(Continued)

FOREIGN PATENT DOCUMENTS

EP      1806387 A1     7/2007

(Continued)

*Primary Examiner* — Joseph Martinez
*Assistant Examiner* — James R Greece
(74) *Attorney, Agent, or Firm* — Tim Tingkang Xia; Morris, Manning & Martin, LLP

(57) ABSTRACT

The present invention relates to a method for manufacturing a polarized lens. In one embodiment, the method includes the steps of treating a polarized film with a composition to form a treated polarized film, providing a front lens mold having a concave surface with a curvature, spin-coating a hard coat composition onto the concave surface of the front lens mold to form a hard coat layer thereon, forming a first adhesive layer on the hard coat layer, placing the treated polarized film on the adhesive layer, curing the adhesive layer with UV or visible light to bond the treated polarized film to the hard coat layer, thereby forming a polarized front lens mold, and forming a polarized lens with the polarized front lens mold.

28 Claims, 3 Drawing Sheets

U.S. PATENT DOCUMENTS

| | | |
|---|---|---|
| 5,808,721 A | 9/1998 | Wood et al. |
| 5,827,614 A | 10/1998 | Bhalakia et al. |
| 5,830,578 A | 11/1998 | Ono et al. |
| 5,882,774 A | 3/1999 | Jonza et al. |
| 5,926,310 A | 7/1999 | Tamura et al. |
| 5,965,247 A | 10/1999 | Jonza et al. |
| 5,991,072 A | 11/1999 | Solyntjes et al. |
| 6,220,703 B1 | 4/2001 | Evans et al. |
| 6,650,473 B2 | 11/2003 | Nakagoshi |
| 7,114,696 B1 | 10/2006 | Su |
| 7,220,120 B2 | 5/2007 | Su |
| 2001/0028436 A1* | 10/2001 | Evans et al. .................. 351/163 |
| 2004/0222537 A1 | 11/2004 | Sidhu et al. |
| 2005/0095422 A1 | 5/2005 | Sager et al. |
| 2005/0243274 A1* | 11/2005 | Chou ............................ 351/177 |
| 2006/0103041 A1 | 5/2006 | Su et al. |
| 2006/0176571 A1 | 8/2006 | Mosse et al. |
| 2007/0243287 A1 | 10/2007 | Su et al. |

FOREIGN PATENT DOCUMENTS

| | | |
|---|---|---|
| WO | 2005045525 A1 | 5/2005 |
| WO | 2006055677 A1 | 5/2006 |
| WO | 2006055815 A2 | 5/2006 |

* cited by examiner

METHOD FOR MANUFACTURING POLARIZED OPHTHALMIC LENSES

CROSS-REFERENCE TO RELATED PATENT APPLICATION

This application claims priority to and the benefit of, pursuant to 35 U.S.C. §119(e), U.S. provisional patent application Ser. No. 60/974,515, filed Sep. 24, 2007, entitled "METHOD FOR PREPARING POLARIZED LENSES," by Kai C. Su and Patrick Culley, the content of which is incorporated herein in its entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference were individually incorporated by reference.

FIELD OF THE INVENTION

The present invention relates generally to a lens, and more particularly to a polarized lens and methods of manufacturing same.

BACKGROUND OF THE INVENTION

Polarized lenses for eyewear have been in use for decades. Polarized lenses can selectively eliminate glare that originates from the reflection and subsequent polarization of light from flat surfaces such as pavement, water, sand or snow.

Currently, polarized lenses are produced following two general methods. One method is to attach a polarized film to an existing lens. The other is to sandwich a polarized film between two half lenses. Both methods have inherent problems such as delaminating of the film from the lens and errors due to the film becoming wrinkled, creased or non-uniform when it is being attached to the lens structures. In addition, the method of attaching the film to a lens has the additional step of hard coating the exposed polarized film to reduce scratches. The sandwich method has the additional disadvantage of having the film near the middle of the lens which limits the minimum lens thickness that can be achieved after lathing. Often, a polarized film is laminated to another material before it is used for lens manufacture in order to protect it from scratching or other damage due to moisture, heat and chemical attack encountered during manufacturing. This may further increase the chance for delaminating and also complicate the manufacturing process.

Various approaches have been developed. For example, U.S. Pat. No. 6,220,703 to Evans et al. discloses ophthalmic lenses utilizing polyethylene terephthalate (PET) polarizing films, where the PET polarized film is integrally affixed to a thermoplastic lens during molding or to a thermoset lens during curing. In this approach, a hard coat is optionally applied in a second step after the polarizer is attached to the lens.

Additionally, finished, spherical polarized lens of a variety of powers and diameters may be held in inventory until they are ready to be edged to fit into an eyeglass frame. Alternatively, the lens power is lathed into a smaller inventory of semi-finished polarized lens blanks as needed. However, toric, polarized lens must be manufactured from polarized semi-finished lenses because of the tremendous inventory that would be required to otherwise stock every power and axis prescription needed.

Therefore, a heretofore unaddressed need exists in the art to address the aforementioned deficiencies and inadequacies.

SUMMARY OF THE INVENTION

In one aspect, the present invention relates to a method for manufacturing a polarized lens. In one embodiment, the method includes the steps of treating a polarized film with a composition to form a treated polarized film. The composition is adapted for providing a reactive chemical group on the polarized film to form a connecting bridge to the lens. The composition contains a sol-gel component and a reactive monomer including methacryloxypropyl trimethoxysilane. In one embodiment, the sol-gel component contains titanium isopropoxide (TIP). In another embodiment, the sol-gel component contains an ethyl acetate modified TIP. The polarized film is characterized with a curvature and color. In one embodiment, the polarized film is formed of polyvinylalcohol (PVA) or polyethylene terephthalate (PET).

The method also includes the step of providing a lens mold having a front lens mold and a rear lens mold, wherein the front lens mold has a concave surface with a first curvature, and the rear lens mold has a convex surface with a second curvature. In one embodiment, the first curvature and the second curvature are substantially identical, so that the concave surface of the front lens mold is substantially complementary to the convex surface of the rear lens mold. In another embodiment, the first curvature and the second curvature are substantially different. In one embodiment, each of the front lens mold and the rear lens mold is formed by glass, plastic or metal.

The method further includes the step of forming a hard coat layer on the concave surface of the front lens mold. The hard coat layer is formed of a hard coat composition that contains dipentaerythritol pentaacrylate (SR399), ethanol, IRGACURE® 907, and Byk-UV3500. In one embodiment, the step of forming the hard coat layer is performed by spin-coating or spray coating the hard coat composition onto the concave surface of the front lens mold. The method may also include the step of depositing the hard coat composition onto the convex surface of the rear lens mold to form a hard coat layer thereon.

Furthermore, the method includes the steps of forming an adhesive layer on the hard coat layer, placing the treated polarized film on the adhesive layer, and curing the adhesive layer to bond the treated polarized film to the hard coat layer, thereby forming a polarized front lens mold. In one embodiment, the adhesive layer is formed of a composition that contains about 100 parts SR150, 1.0 part triphenylphosphine and 1.0 part IRGACURE® 184. The step of curing the adhesive layer is performed with UV or visible light.

Moreover, the method includes the steps of combining the polarized front lens mold with the rear lens mold to define a cavity between the treated polarized film and the convex surface of the rear lens mold, casting a lens-forming fluid into the cavity, and curing the lens-forming fluid within the cavity to form a lens having dimensions substantially identical to the cavity.

In another aspect, the present invention relates to a polarized lens fabricated according to the method as disclosed above.

In yet another aspect, the present invention relates to a method for manufacturing a polarized lens, comprising the steps of treating a polarized film with a composition to form a treated polarized film, providing a front lens mold having a concave surface with a curvature, spin-coating a hard coat composition onto the concave surface of the front lens mold to form a hard coat layer thereon, forming a first adhesive layer on the hard coat layer, placing the treated polarized film on the adhesive layer, curing the adhesive layer with UV or visible light to bond the treated polarized film to the hard coat layer, thereby forming a polarized front lens mold, and forming a polarized lens with the polarized front lens mold.

In one embodiment, the polarized film is formed of polyvinylalcohol (PVA) or polyethylene terephthalate (PET).

In one embodiment, the composition is adapted for providing a reactive chemical group on the polarized film to form a connecting bridge to the lens, and contains a sol-gel component and a reactive monomer including methacryloxypropyl trimethoxysilane. The sol-gel component contains titanium isopropoxide (TIP), or an ethyl acetate modified TIP.

In one embodiment, the hard coat layer is formed of a hard coat composition that contains dipentaerythritol pentaacrylate (SR399), ethanol, IRGACURE® 907, and Byk-UV3500.

In one embodiment, the step of forming the polarized lens comprises the steps of forming a second adhesive layer on the treated polarized film of the polarized front lens mold, placing a pre-formed lens on the second adhesive layer, and curing the second adhesive layer with UV or visible light to bond the pre-formed lens to the polarized front lens mold, thereby forming a polarized lens. The first adhesive layer is formed of a first adhesive composition, and wherein the second adhesive layer is formed of a second adhesive composition that is identical to or different from the first adhesive composition.

In another embodiment, the step of forming the polarized lens comprises the steps of providing a rear lens mold having a convex surface with a curvature, combining the polarized front lens mold with the rear lens mold to define a cavity between the treated polarized film and the convex surface of the rear lens mold, casting a lens-forming fluid into the cavity, and curing the lens-forming fluid within the cavity to form a lens having dimensions substantially identical to the cavity. The curvature of the convex surface of the rear lens mold is substantially identical to or different from the curvature of the concave surface of the front lens mold.

The step of forming the polarized lens may further comprise the step of forming a second adhesive layer between the lens and the treated polarized film.

Additionally, the step of forming the polarized lens may include the step of removing both the front lens mold and the rear lens mold from the polarized lens.

In a further aspect, the present invention relates to a polarized lens fabricated according to the method disclosed above.

In yet a further aspect, the present invention relates to a polarized lens. In one embodiment, the polarized lens has a lens member having a front surface and a rear surface, a treated polarized film positioned on the front surface of the lens member, and a hard coat layer formed on the treated polarized film. The polarized lens may further include a first adhesive layer formed between the hard coat layer and the treated polarized layer, and a second adhesive layer formed between the treated polarized layer and the lens member.

The polarized film is formed of polyvinylalcohol (PVA) or polyethylene terephthalate (PET). In one embodiment, the treated polarized film is obtained by treating a polarized film with a composition adapted for providing a reactive chemical group on the polarized film to form a connecting bridge to the lens, and contains a sol-gel component and a reactive monomer including methacryloxypropyl trimethoxysilane, where the sol-gel component contains titanium isopropoxide (TIP), or an ethyl acetate modified TIP.

In one embodiment, the hard coat layer is formed of a hard coat composition that contains dipentaerythritol pentaacrylate (SR399), ethanol, IRGACURE® 907, and Byk-UV3500.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
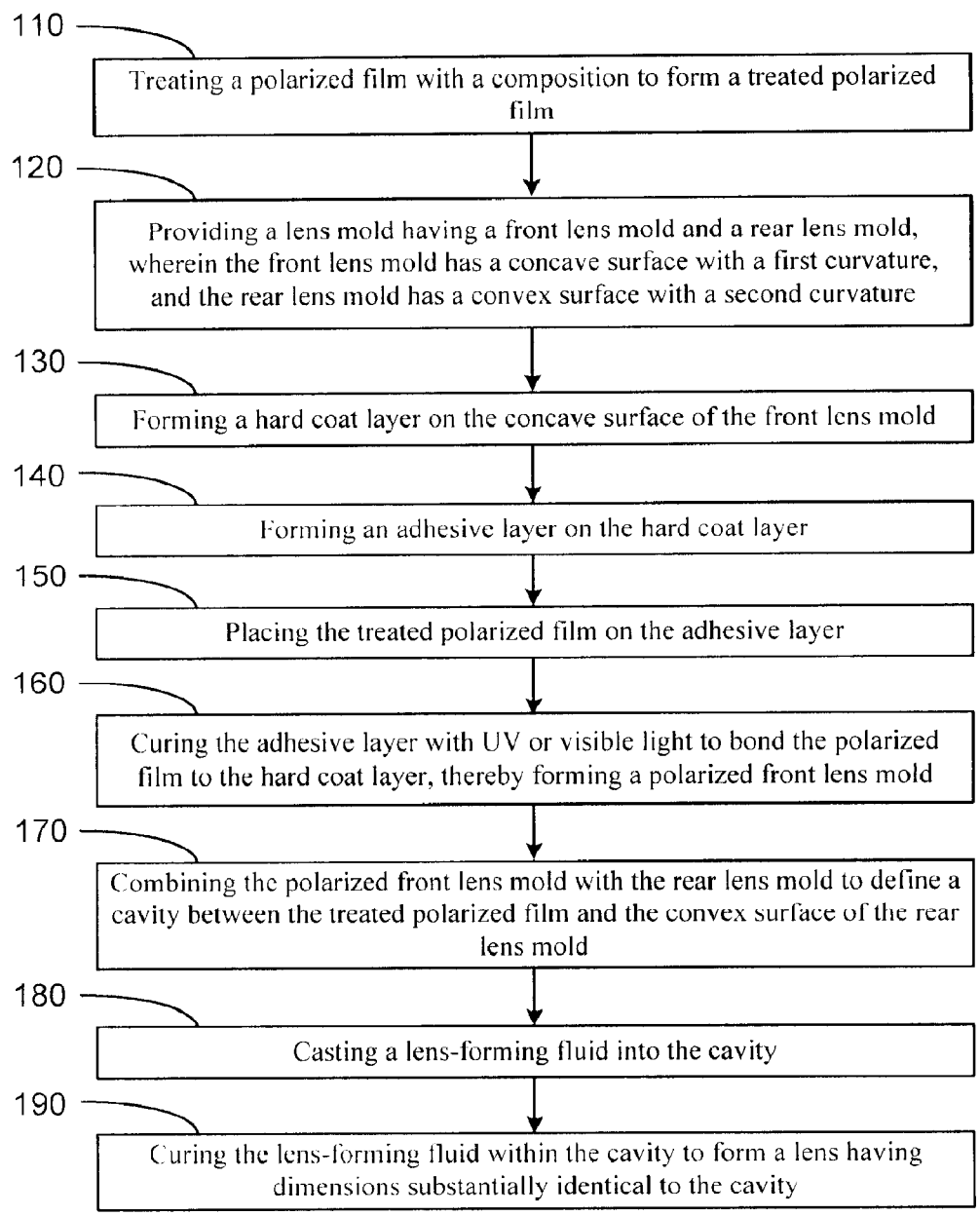
FIG. 1 shows a flowchart related to a method for manufacturing a polarized lens according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

OVERVIEW OF THE INVENTION

The description will be made as to the embodiments of the present invention in conjunction with the accompanying drawings in FIGS. 1-4. In accordance with the purposes of this invention, as embodied and broadly described herein, this invention, in one aspect, relates to a method for manufacturing hard coated polarized finished and semi-finished lens.

According to the method, a transferable hard coat is applied to the front lens mold of a lens by spin-coating, printing or spray coating. An optical adhesive is applied to the hard coated front lens mold. A polarized film with a curvature matching the front lens mold is placed on the optical adhesive. The film may contain a temperature sensitive adhesive layer or may be pre-treated to modify the surface such as by chemical treatment, UV, plasma or corona treatment. In one embodiment, the polarized film contains a temperature sensitive adhesive. The hard coated mold, optical adhesive and polarized film assembly is gently heated with an IR lamp. The heat allows the optical adhesive to flow due to the effect of heat in reducing the optical adhesive viscosity. By using capillary action of the mold and the polarized film the optical adhesive spreads out into an even layer. Also the heat activates the temperature sensitive adhesive that was present on the polarized film. Now that the optical adhesive is in a thin layer between the polarized film and the hard coated front mold, the optical adhesive is cured in place with radiation, either visible or UV energy.

The front mold with a hard coat, optical adhesive and polarized film is mated with a back mold. A liquid monomer is injected between the modified front mold and the back mold. The monomer is radiation cured to the shape of the front and back mold. The liquid monomer also reacts with the adhesive on the polarized film during polymerization. When the molds are separated from the lens, the polarized film is now embedded between the lens material and optical adhesive. The hard coat also transfers to the new lens so that no further surface coating of the lens is required. Although this example uses plastic molds, glass or metal molds could be used as well. An advantage of the present invention is reduced inventory requirements to manufacture a wide range of polarized lens prescriptions, including toric lenses as compared to the number of semi-finished and finished polarized lenses that would be required to cover a comparable prescription range. This is because, each hard coated polarized front lens mold can be mated with a plurality of back molds for manufacturing a range of prescriptions. Using the lens molds for producing hard coated polarized toric lenses, the power axis is easily aligned with the polarizer axis by adjustment of the orientation of the front mold with the back mold.

In one embodiment, a transferable hard coat was spin-coated onto a polystyrene front mold with the base curvature of 350. The hard coat was exposed to weak UV radiation for about 2 minutes to partially cure the hard coat.

A radiation curable optical adhesive was applied on top of the hardcoat. The PVA polarized film was placed on top of the adhesive. The mold-adhesive-polarized film assembly was gently warmed with IR radiation for about 15-45 seconds to promote the adhesive becoming a thin, even film. The PVA polarized film was affixed in place using UV radiation for about 2 minutes.

The treated front mold is paired with a back mold to match the curvatures of the desired power lens. A transferable hard coat was previously applied to the back mold. Both molds are inserted into a holder ring. A radiation curable acrylate formulation is injected into the space between the front and back molds. The assembly is radiation cured to create a lens. When the lens molds are removed, the PVA polarized film is embedded in the lens with the exterior covered by a hard coat.

Figure 2:
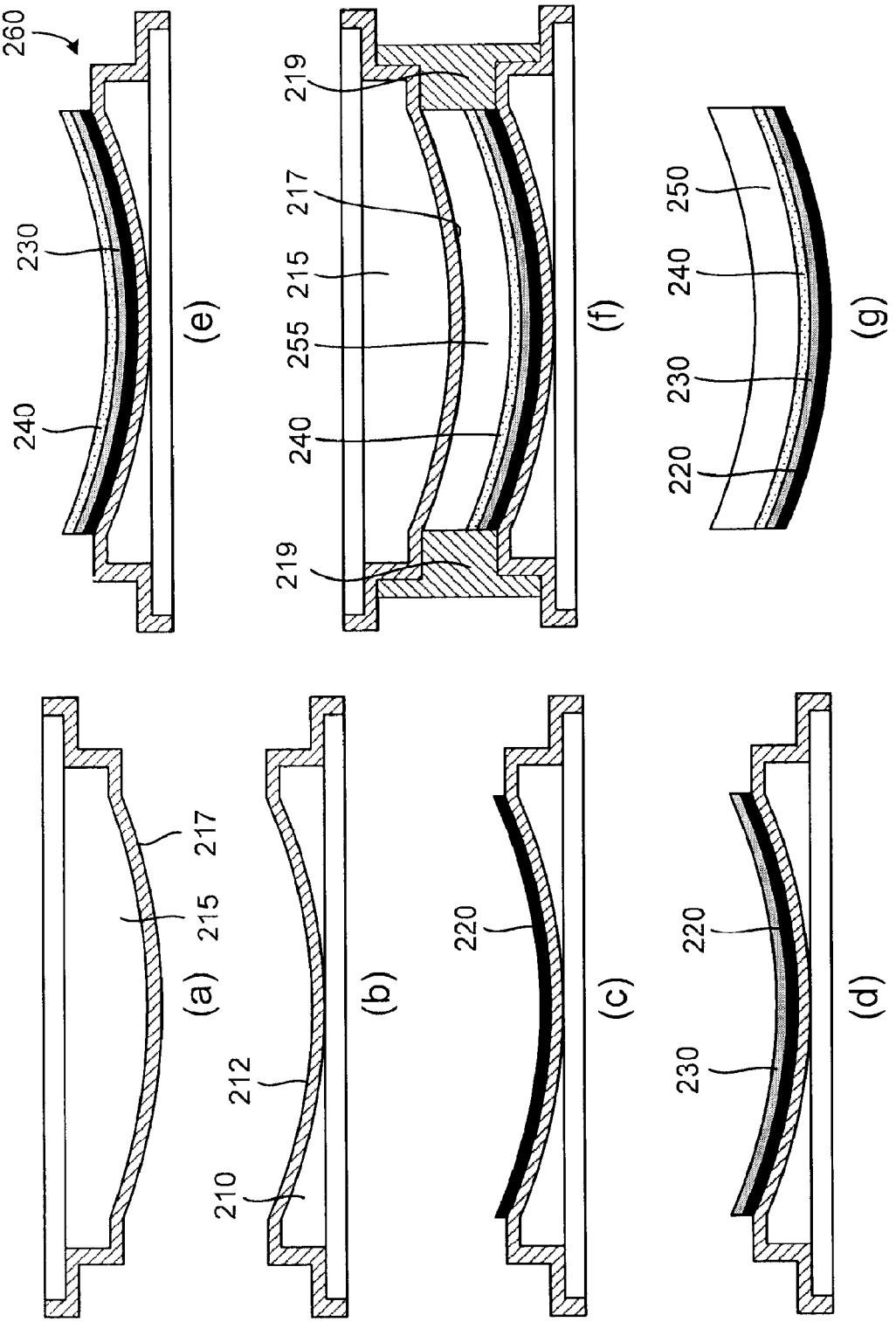
FIG. 2 shows preparation of a hard coated polarized lens by casting and curing a lens monomer between the lens molds connected with a gasket according to one embodiment of the present invention.

Referring to FIGS. 1 and 2, a method for manufacturing a polarized lens is shown according to one embodiment of the present invention. The method 100 includes the following steps: At step 110, a polarized film is treated with a composition to form a treated polarized film 240. The composition is adapted for providing a reactive chemical group on the polarized film to form a connecting bridge to the lens, and contains a sol-gel component and a reactive monomer including methacryloxypropyl trimethoxysilane. The sol-gel component contains titanium isopropoxide (TIP), or an ethyl acetate modified TIP. When the titanium sol-gel component is hydrolyzed, RO-Ti-OR' reacts with the hydroxyl group of a polarized PVA film to form PVA-O-Ti-O-R', the siloxane portion of MAPTMS in the methacryloxypropyl trimethoxysilane reacts with -Ti-OR' to form PVA-O-Ti-OSi-Methacrylate, and the methacrylate group reacts with acrylate, methacrylate, urethane or vinyl groups in a lens monomer, coating and adhesive compositions. The polarized film is characterized with a curvature and color. For example, the curvature of the polarized film can be in 400, 600, 800, or the like. The color of the polarized film can be brown, blue, black, or the like. In one embodiment, the polarized film is formed of polyvinylalcohol (PVA) or polyethylene terephthalate (PET).

At step 120, a lens mold having a front lens mold 210 and a rear lens mold 215 is provided. The front lens mold 210 has a concave surface 212 with a first curvature, and the rear lens mold 215 has a convex surface 217 with a second curvature, as shown in FIGS. 2(a) and 2(b). The first curvature and the second curvature are substantially identical or different. If both the first curvature and the second curvature are identical, the concave surface 212 of the front lens mold 210 is substantially complementary to the convex surface 217 of the rear lens mold 215. Each of the front lens mold 210 and the rear lens mold 215 is formed of glass, plastic or metal. The lens mold may further have a gasket 219 such that when assembled, the gasket 219 seals the lens cavity 255, as shown in FIG. 2(f).

The lens mold of the present invention is suitable for use with a variety of resin compositions to form finished optical lenses. In general, the lens mold is well suited to the use of radiation initiated curing processes, such as by exposure to ultraviolet or visible light, but can also include thermally cured materials if the thermal cure temperature is below the glass transition temperature Tg of the lens mold. The examples of the lens mold are disclosed in U.S. Pat. Nos. 7,220,120 and 7,114,696 to Su et al., U.S. Publication Nos. 20070243287 and 2006/0103041 to Su et al. and PCT Publication Nos. WO 2006/055815 and WO/2006/055677 to Su et al., the disclosures of which are incorporated herein in their entireties by reference, respectively.

With respect to the order of step 110, treating the polarized film and step 120, providing the lens mold, there is no preference for successfully practicing the present invention. One can treat the polarized film first or second; or alternatively, one can treat the polarized film and provide the lens mold both substantially at the same time.

At step 130, a hard coat layer 220 is formed on the concave surface 212 of the front lens mold 210, as shown in FIG. 2(c). The hard coat layer 220 is formed of a hard coat composition that contains dipentaerythritol pentaacrylate (SR399), ethanol, IRGACURE® 907, and Byk-UV3500. In one embodiment, the step of forming the hard coat layer is performed by spin-coating the hard coat composition onto the concave surface 212 of the front lens mold 210. Other processes and hard coat compositions can also be used to practice the present invention.

In one embodiment, a hard coat composition may be applied to the convex surface 217 of the rear lens mold 215, by spin coating to form a hard coat layer thereon.

In certain embodiments of the invention a coating is applied to the interior of the mold prior to forming the lens. In some embodiments the coating is applied to interior portions of the mold by dip coating, spin coating, spray coating, flow coating, electrostatic spray, roll coating, modified roll coating, print coating, or other coating method. The coating may then optionally also be subjected to a "precure" to partially cure the coating so that it will stay in place and not move during subsequent steps in the process.

The lens mold can be coated with any of a variety of coating formulations, provided that the coating does not chemically attack the mold. The coating formula can include, for example, acrylate functional materials capable of crosslinking, sol-gels, nanoparticle-based coatings, initiators or catalysts capable of initiating the reaction of acrylates, flow or leveling agents, defoamers, stabilizers, UV absorbers, antioxidants, dyes, and possibly solvents. Some solvents can be used in the coating formulation, as long as such formulations do not substantially attack the mold before the formulation has cured. Solvents that could be used would include alcohols, glycols ethers, etc. Solvents that would be less acceptable for use would include lower molecular weight ketones such as acetone, methyl ethyl ketone, methyl isobutyl ketone (MIBK), cyclohexanone; acetates; aromatic solvents such as benzene, xylenes; and low MW hydrocarbons such as hexane, etc.

Suitable coatings include those that provide a hard coat for improved scratch-resistance, a tintable coat for the purpose of making sunglasses or other "fashion" tints, a UV coat to prevent certain wavelengths of UV light to pass through the lens, an AR ("anti-reflective") coat to prevent glare, or any other type of ophthalmic coating. The coating should be selected so that it does not attack the mold material. Such coatings remain on the mold temporarily and are transferred to the finished lens during the lens curing step. Thus, the coating is applied to the mold with the intent that it becomes an integral part of the finished lens.

In general it is desirable that the coating not attack the interior of the lens mold and be readily releasable from the mold. Accordingly, coating formulations should not have enough solvating power to attack the mold. As one skilled in the art would appreciate, the coatings could be based on UV-curable acrylic, sol-gel, or other composition types. The coating preferentially has a more complete cure at the mold/coating interface than at the coating/air interface.

In an acrylic coating, the major constituents of the protective coating include multifunctional acrylates or methacrylates, including tri-, tetra-, penta-, and hexafunctional materials capable of providing high levels of cross-linking. The molecular weight of these constituents must be high enough to prevent attack on the mold. The protective coating could contain a small amount of a low-viscosity diluent with at least two ethylenic groups to adjust for coating viscosity, but the majority of the formulation will contain higher molecular weight, higher viscosity materials. Examples of materials commonly used in coatings are in the attached table and illustrate the importance of the use of appropriate materials with plastic molds.

At step 140, an adhesive layer 230 is formed on the hard coat layer 220, as shown in FIG. 2(*d*). The adhesive layer 230 is formed of a composition that contains about 100 parts SR150, 1.0 part triphenylphosphine and 1.0 part IRGA-CURE® 184. Other adhesive compositions can also be utilized to practice the present invention.

At step 150, the treated polarized film 240 is placed on the adhesive layer 230, as shown in FIG. 2(*e*).

At step 160, the adhesive layer 230 is cured so as to bond the treated polarized film 240 to the hard coat layer 220, thereby forming a polarized front lens mold 260. The curing is performed with UV or visible light incident from the top (the treated polarized film 240) and/or the bottom (the front lens mold 210) of the polarized front lens mold 260.

At step 170, the polarized front lens mold 260 is combined with the rear lens mold 215 to define a cavity 255 between the treated polarized film 240 and the convex surface 217 of the rear lens mold 215. Additionally, a gasket 219 is applied to the lens mold assembly for sealing the lens cavity 255, as shown in FIG. 2(*f*). The lens mold assembly may have a channel (not shown) in fluid communication with the cavity for casting a lens forming fluid.

Then, the lens-forming fluid is cast into the cavity 255 at step 180. At step 190 the lens-forming fluid within the cavity 255 is cured so as to form a lens 250 having dimensions substantially identical to the cavity 255. Finally, the polarized lens is obtained by removing the front lens mold 210, the rear lens mold 215 and the gasket 219. In one embodiment, the lens-forming fluid includes liquid monomer that is injected between a hard coated front and rear lens molds. The monomer is radiation cured to be the shape of the front and rear lens mold with the hard coat reacting with the curing monomer. The hard coat releases from the lens molds upon separating the lens molds from the cast lens.

Suitable lens forming compositions include materials having low cure temperatures, which cure quickly, including acrylates and methacrylates. In some implementations epoxies can be used.

It is generally desirable to have the lens forming formulation be inert or substantially inert to the mold itself. However, in certain circumstances the lens material is not inert to the mold material, in which case an intermediate, transferable, coating material can be used to prevent degradation of the mold. Typically the coating is applied first to the interior of the mold, cured or partially cured, and then the primary lens forming formulation is added.

Any of a variety of photocleavable or thermal initiators can be used. The level of photo initiator or thermal initiator used is typically low (less than 5%) and would not have a significant impact on the chemical aggressiveness of the lens formulation on the mold. In general, lower temperature curing of the lens is preferred, accomplished with UV or visible light photo initiators, low initiation temperature thermal initiators or a combination of both. A variety of light sources can be used, including those with output in the UV-A, UV-B and visible ranges, or combinations thereof.

Depending on the choice of thermoplastic materials used, there will be certain chemistries and/or process parameters that will allow the mold to be used satisfactorily. Based on the simple chemical notion that "like dissolves like," each different type of thermoplastic material can be used without issue with certain ingredients typical of a coating formulation and/or lens formulation. In order to determine if a raw material (or group of raw materials in a formulation) will be chemically compatible with mold material, any number of tests can be employed:

One screening test for chemical compatibility involves a representative sample of the thermoplastic material to be placed in close contact with the chemical to be tested. This "close contact" can involve soaking the thermoplastic in the test solution, or the test solution can be allowed to sit on top of the thermoplastic material. The time and temperature during which the two materials are in contact are controlled variables in the test. After the test period is over, all excess test solution is removed from the thermoplastic material by simple wiping, and the thermoplastic is evaluated for any damage by measuring any change in physical appearance, any change in percent transmittance, any change in refractive index, any change in tensile strength, any change in flexibility, any change in weight or size, any change in surface smoothness, or any change in optical properties.

In certain embodiments of the invention, the formulation used to form or coat the lenses and the material used to form the mold are selected based upon solubility properties of the mold material and the lens forming or coating formulation. In general it is desirable to have low solubility of the mold material in the lens forming formulation. Although it is difficult to determine solubility of a solid material in a resin, the durablity of the mold can be used as an indication of solubility. Applicants have found that the lens forming or coating formulation should be selected such that the resin does not significantly degrade optical properties of the mold surface upon exposure to the resin.

Any significant change in any of the above properties of the thermoplastic constitutes damage to the material, and the thermoplastic material cannot be used with that test solution. However, it is still quite possible that although a certain ingredient is known to attack a particular thermoplastic material, that ingredient can still be used in small amounts in solution, provided that the other components are compatible with the thermoplastic. Numerous examples of such scenarios are provided for in this patent.

Among other things, the invented method has advantages over other methods for the application of polarizing films. One such advantage is that the sol-gel formation occurs at low enough temperatures (e.g., less than 900 to 95° C.) that the polarized film is not distorted. Furthermore, the method does not use water which can dissolve PVA and cause dyes in a polarized PVA film to leach out.

Figure 3:
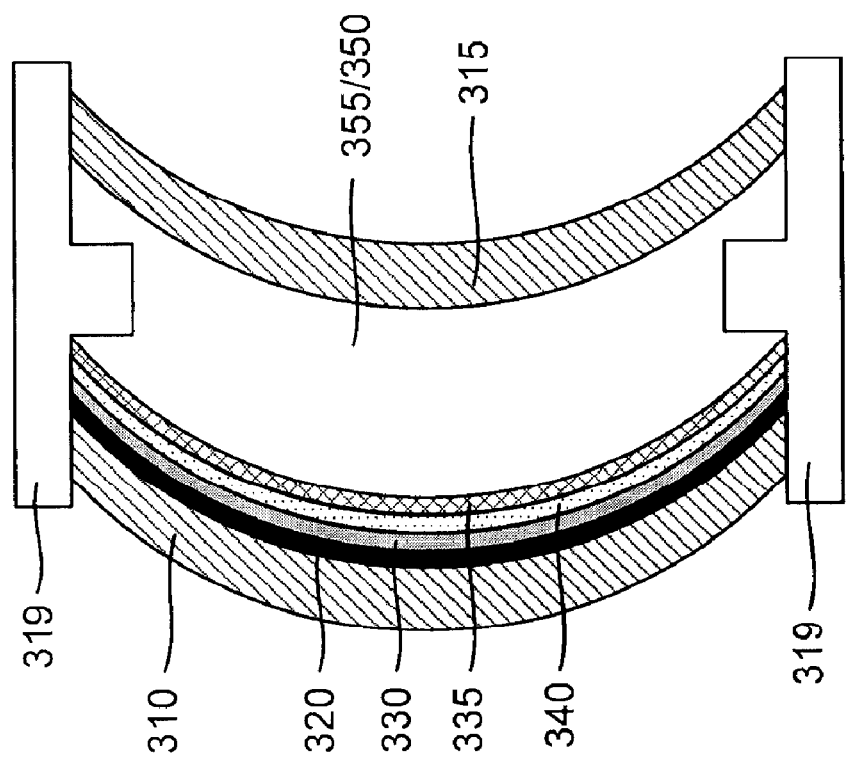
FIG. 3 shows preparation of a hard coated polarized lens according to one embodiment of the present invention.

FIG. 3 shows a process for manufacturing a polarized lens according to another embodiment of the present invention. Similar to the process disclosed above, the process includes the steps of providing a polarized film 340, wherein the polarized film may be pre-treated such as with UV radiation, plasma, corona or chemical treated (e.g. sol gel), providing a front lens mold 310 having a concave surface with a curvature and a rear lens mold 315 having a convex surface with a curvature, coating a hard coat composition onto the concave surface of the front lens mold 310 to form a hard coat layer 320 thereon, forming a first adhesive layer 330 on the hard coat layer 320, placing the treated polarized film 340 on the adhesive layer 330, curing the adhesive layer with UV or visible light to bond the treated polarized film 340 to the hard coat layer 320, thereby forming a polarized front lens mold, combining the polarized front lens mold with the rear lens mold 315 to define a cavity 355 therewith, casting a lens-forming fluid into the cavity 355, and curing the lens-forming fluid within the cavity 355 to form a lens 350 having dimensions substantially identical to the cavity 355. In addition, the process also includes the step of forming a second adhesive layer between the lens 350 and the treated polarized film 340. The first adhesive layer 330 is formed of a first adhesive composition, and the second adhesive layer 335 is formed of a second adhesive composition that is identical to or different from the first adhesive composition.

Additionally, a gasket/lens holder 319 is used to seal or hold the lens mold and the polarized lens formed therein.

Figure 4:
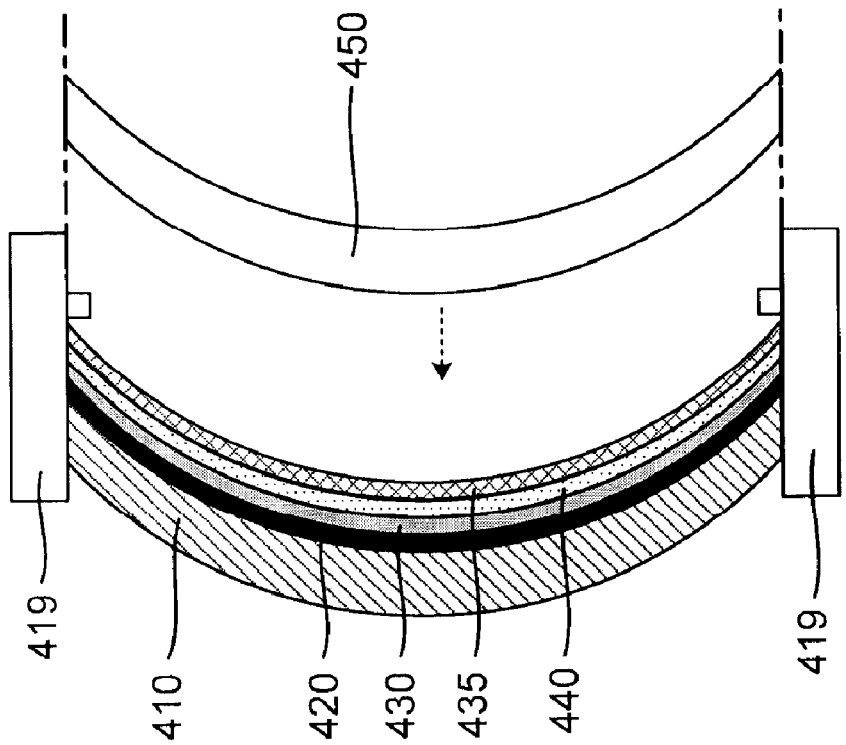
FIG. 4 shows preparation of a hard coated polarized lens by transferring a hard coat and polarized film to a pre-formed lens according to one embodiment of the present invention.

Referring to FIG. 4, a process for manufacturing a polarized lens with a pre-formed lens is shown according to one embodiment of the present invention. Similar to the process described above and shown in FIG. 3, the polarized lens is formed to have a hard coat layer 420, a first adhesive layer 430 formed on the hard coat layer 420, a treated polarized film 440 formed on the first adhesive layer 430, and a second adhesive layer 435 formed on the treated polarized film 440. However, in this embodiment, the lens 450 is pre-formed. In assembly, the pre-formed lens 450 is pushed towards the second adhesive layer 435 and adhered thereto.

These and other aspects of the present invention are more specifically described below.

IMPLEMENTATIONS AND EXAMPLES OF THE INVENTION

Without intent to limit the scope of the invention, additional exemplary embodiment and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example 1

Affixing a Polarized PVA Film to a Plastic Lens Formed by Casting

This example shows how a polarized PVA film is affixed to a plastic lens formed by casting so as to produce a polarized lens according to one embodiment of the present invention.

Forming a hard coat layer on a plastic (polystyrene) progressive front lens mold: In this example, the polystyrene progressive front lens mold is fabricated by injection molding. The polystyrene progressive front lens mold can also be fabricated by other processes. The hard coat layer is formed of a hard coat composition 139-88 that in the embodiment contains about 9.8 g SR399 (Sartomer Company Inc., Exton, Pa.), 15.0 g Ethanol, 0.25 g Irgacure 907 (Ciba Specialty Chemicals Holding Inc., Basel, Switzerland), and 0.25 g Byk-UV3500 (ByK-Chemie Inc., Wallingford, Conn.). SR-399 is a monomer dipentaerythritol pentaacrylate and combines abrasion resistance and flexibility with hardness and fast cure response for ultraviolet and electron beam curing. The hard coat composition 139-88 is spin-coated onto the polystyrene progressive front lens mold 210 at spin coating conditions of speed at about 600 RPM and dry time about 30 minutes so as to form a hard-coated progressive front lens mold. The hard-coated polystyrene progressive front lens mold is then precured by ultraviolet light.

Treating a polarized PVA film with a composition 139-09 to form a treated polarized PVA film: The composition 139-09 contains about 0.5% MAPTMS, 0.3% Tyzor AA (DuPont de Nemours & Co.), 0.06% Irgacure-907 added to 1-Methoxy-2-propanol (Sigma-Aldrich, St. Louis, Mo.). The treating process is performed by dipping a 600 polarized PVA film (in brown) (PT&T Co., Ltd., Korea) into the composition 139-09 for about 10 seconds and drying it for about 10 seconds to remove excess solution, drying the film in an oven at temperature in a range of about 75-80° C. for about 20 minutes, and then cooling the film at room temperature for about 5-10 minutes, so as to form a treated polarized PVA film.

Adhering the pretreated polarized PVA film onto the hard-coated progressive front lens mold: At first, an adhesive composition 139-25E is applied to the hard coat layer 220 of the hard-coated progressive front lens mold 210 to form an adhesive layer thereon. The composition 139-25E contains about 100 parts SR150 (Sartomer Company Inc., Exton, Pa.), 1.0 parts Triphenylphosphine (Sigma-Aldrich, St. Louis, Mo.) and 1.0 parts IRGACURE® 184 (Ciba Specialty Chemicals Holding Inc., Basel, Switzerland). Then, the treated polarized PVA film is positioned onto the adhesive layer. Next, a 600 base curve lens is placed on the top of the polarized PVA film, which forms a lens assembly. Subsequently, the lens assembly is cured for about 2 minutes using visible light incident from the top and bottom of the lens assembly for adhesion. Then, the polarized PVA film is trimmed from edges of the progressive front lens mold.

Forming a polarized lens: the polarized progressive front lens mold is combined with a plastic back mold and gasket to define a lens cavity therewith. Then, a lens-forming fluid is cast into the cavity, and a lens having dimensions the same as the cavity is formed by curing the lens-forming fluid within the cavity, according to the process developed by the inventors and disclosed in U.S. Pat. Nos. 7,220,120 and 7,114,696 to Su et al., U.S. Publication Nos. 20070243287 and 2006/0103041 to Su et al. and PCT Publication Nos. WO 2006/055815 and WO/2006/055677 to Su et al., the disclosures of which are incorporated herein in their entireties by reference, respectively.

The polarized lens is then formed by removing the front lens mold, the plastic back mold and the gasket.

Example 2

Procedure for Applying a Polarized PVA Film to a Polycarbonate Lens

This example shows a method of applying a polarizing film to a polycarbonate lens according to one embodiment of the present invention. The method includes the following processes:

Preparation of Hard Coat Formulation for Spincoat Application

The following describes the procedure for the preparation of a modified hard coat formulation, which is spin-coated onto molds and transferred to a lens.

Associated Materials and Tools: A 250 cc glass amber bottle with lid, a 120 cc glass amber bottle with lid, a stir plate with heat, a stir bar, a balance with 0.01 g accuracy to 600 g, weigh paper, a disposable transfer pipet, a spatula, a small funnel, No. 4 Whatman filter paper, SR295 (Sartomer Company Inc., Exton, Pa.), MOP, 1-Methoxy-2-propanol (No. 484407, Sigma-Aldrich, St. Louis, Mo.), IPA, 2-Propanol (No. A416, Fisher Scientific, Pittsburgh, Pa.), UV initiator, Irgacure 907 (Ciba Specialty Chemicals Holding Inc., Basel, Switzerland), and SA-LH (Lambert Technologies).

Procedure:
(1). Place the 250 cc amber bottle on the balance and tare the balance to 0.00 g,
(2). Place the large stir bar into the amber bottle,
(3). Charge 39.20 g (±0.05 g) of SR295 into the amber bottle,
(4). Add 30.00 g (±0.50 g) of MOP into the amber bottle,
(5). Add 30.00 g (±0.50 g) of IPA into the amber bottle,
(6). Place the cap on the bottle and shake the same until the stir bar is loose from the SR399,
(7). Place the amber bottle on the stir plate and loosen the cap of the amber bottle,
(8). Start stirring the solution to disperse the SR295 into the MOP and IPA,
(9). Gently heat the amber bottle for about one hour on the lowest heat setting of the stir plate,
(10). Turn off the heat of the stir plate,
(11). Weigh out 1.00 g (0.02 g) of Irgacure 907 onto weighing paper,
(12). Transfer the Irgacure 907 into the amber bottle,
(13). Stir for about 5 minutes to dissolve the solid,
(14). Return the amber bottle to the balance,
(15). Carefully add 1.00 g (0.02 g) of SA-LH to the amber bottle,
(16). Return the amber bottle to the stir plate and stir for 30 minutes, and
(17). Filter the hard coat formulation through the No. 4 Whatman filter paper into the 120 cc amber bottle.

Spincoating of Hard Coat onto a Glass Mold

The following describes the procedure for spin coating a hard coat onto a glass mold. After a hard coat is applied, the glass mold is used for adhesion of a PVA film to a polycarbonate lens.

Associated Materials And Tools: Hard coat formulation formed according to the above procedure, a glass mold, a spin coating machine, a dry box, a transfer pipette, an UV cure box, and a storage box.

Procedure:
(1). Clean the glass mold of debris,
(2). Insert the glass mold into the spindle of the coating machine,
(3). Set the spindle to about 500 rpm,
(4). Apply about 2-3 ml of the hard coat formulation to the spinning glass mold,
(5). Allow the glass mold to spin for about one minute,
(6). Then transfer the glass mold to the dry box,
(7). Dry the hard coated glass mold for about 30 minutes,
(8). Transfer the hard coated glass mold to the UV cure box,
(9). Cure the hard coat for about two minutes, and
(10). Remove the cured glass mold and place in a clean storage tray.

Preparation of Primer No. 1

The procedure for the preparation of Primer No. 1 is described below.

Associated Materials And Tools: a 2 L metal beaker, a large balance capable of weighing 2 Kg, a stir plate and stir bar, a small balance capable of weighing to 0.0000 g, weigh paper, MOP, 1-Methoxy-2-propanol (No. 484407, Sigma-Aldrich, St. Louis, Mo.), MAPTMS, Methacryoxypropyltrimethoxysilane (No. SIM6487.4, Gelest), an UV initiator, Irgacure 907 (Ciba Specialty Chemicals Holding Inc., Basel, Switzerland), and Tyzor AA (DuPont de Nemours & Co.).

Procedure:
(1). Place the 2 L metal beaker on the large balance and tare the balance to 0.0 g,
(2). Charge 1289.4 g (±5.0 g) of MOP into the metal beaker,
(3). Add 6.5 g (±0.1 g) of MAPTMS into the metal beaker,
(4). Place the metal beaker on the stir plate and stir it to mix,
(5). Using a 0.0000 g balance, weigh out 0.7804 g (0.0050 g) of the UV initiator onto the weigh paper,
(6). Transfer the UV initiator into the metal beaker,
(7). Stir for about 3 to 5 minutes to dissolve the solid,
(8). Return the metal beaker to the large balance and add 3.9 g (0.1 g) of Tyzor AA, and
(9). Stir it for another 1 minute.

Preparation of Adhesive No. 2

Adhesive No. 2 is used between the polarized PVA film and the hard coated glass mold. The procedure for the preparation of Adhesive No. 2 is disclosed as follows:

Associated Materials and Tools: a 120 cc amber bottle, a balance, stir plate and stir bar, weigh paper, SR 150 (Sartomer Company Inc., Exton, Pa.), a visible initiator, Irgacure 184 (Ciba Specialty Chemicals Holding Inc., Basel, Switzerland), and TPP, Triphenylphosphine (Aldrich)

Procedure:
(1). Place the 120 cc amber bottle on the balance and tare the balance to 0.0 g,
(2). Charge 60.0 g (0.5 g) of SR 150 into the amber bottle,
(3). Place a stir bar into the amber bottle,
(4). Weigh out 0.60 g (0.05 g) of Irgacure 184 onto weighing paper,
(5). Transfer the Irgacure 184 into the amber bottle,
(6). Weigh out 0.60 g (0.05 g) of TPP onto weighing paper,
(7). Transfer the TPP to the amber bottle, and
(8). Stir for 60 minutes or until all solid is dissolved.

Adhesion of a Polarized PVA Film to a Polycarbonate Lens

The procedure for adhesion of a PVA film to a polycarbonate lens is described as follows:

Associated Materials And Tools: a primer solution No. 1 formed according to the above procedure, a polarized PVA film, an oven at temperature 80° C., an UV cure box, a lens holder and clamp assembly, a glass mold, a Loctite adhesive, adhesive No. 2, polycarbonate lens, a visible light cure box, a refrigerator, and an oven at temperature 50° C.

Procedure:
(1). The polarized PVA film is soaked in the primer solution No. 1 for about 1 minute,
(2). Remove any excess primer solution from the polarized PVA film,
(3). The soaked polarized PVA film is transferred to the oven at temperature 80° C. and dried for about 20 minutes. The soaked polarized PVA film must rest flat in the first oven to reduce being distorted in shape,
(4). Assemble the lens holder and clamp by the following steps:
  (i) The glass mold is placed into the bottom of the lens holder and clamp assembly,
  (ii) Apply the adhesive No. 2 onto the glass mold,
  (iii) Add the polarized PVA film onto the exposed adhesive No. 2,
  (iv) Apply the Loctite adhesive to the polarized PVA film, and
  (v) Add the polycarbonate lens to the exposed Loctite adhesive,
(5). Add the top of the lens holder and clamp assembly and secure the top with the screws,
(6). Place the entire lens holder and clamp assembly into the visible cure box.
(7). Turn on both the top and bottom cure lights of the cure box and cure for about 15 minutes,
(8). After about 15 minutes turn off the lamps and remove the lens holder and clamp assembly,
(9). Remove the glass mold, polarized PVA film and polycarbonate lens from the lens holder and clamp assembly,
(10). Reinsert the glass mold, polarized PVA film and polycarbonate lens into the visible cure box,
(11). Turn on the light closest to the glass mold and post cure for about 15 minutes,
(12). Turn off the cure light and transfer the glass mold, polarized PVA film and polycarbonate lens to a refrigerator and cool the same for about 20-30 minutes,
(13). Separate the glass mold from the polycarbonate lens with the polarized PVA film, and
(14). Transfer the polycarbonate lens with the polarized PVA film to the 5° C. oven and leave it there overnight.

Example 3

Preparation of a −2.00 Polarized Lens

By the method as depicted in FIG. 2, a transferable hard coat was spin-coated onto a polystyrene front mold with the base curvature of 350. The hard coat was exposed to UV radiation for 2 minutes to partially cure the hard coat.

A radiation curable optical adhesive was applied on top of the hardcoat. A PVA polarized film was placed on top of the adhesive. The mold-adhesive-polarized film assembly was gently warmed with IR radiation for 15-45 seconds to promote the adhesive becoming a thin, even film. The PVA polarized film was affixed in place using UV radiation for 2 minutes.

The treated front mold is paired with a 550 back mold to match the curvatures of the desired −2.00 power lens. A transferable hardcoat was previously applied to the back mold. Both molds are inserted into a holder ring. A radiation curable acrylate formulation is injected into the space between the front and back molds. The assembly is radiation cured to create a lens. When the molds are removed, the PVA polarized film is embedded in the lens with the exterior covered by a hardcoat.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. A method for manufacturing a polarized lens, comprising the steps of:
  (a) treating a polarized film with a composition to form a treated polarized film;
  (b) providing a lens mold having a front lens mold and a rear lens mold, wherein the front lens mold has a concave surface with a first curvature, and the rear lens mold has a convex surface with a second curvature that is substantially identical to or different from the first curvature;
  (c) forming a hard coat layer on the concave surface of the front lens mold;
  (d) forming an adhesive layer on the hard coat layer;
  (e) placing the treated polarized film on the adhesive layer;
  (f) curing the adhesive layer with UV or visible light to bond the treated polarized film to the hard coat layer, thereby forming a polarized front lens mold;
  (g) combining the polarized front lens mold with the rear lens mold to define a cavity between the treated polarized film and the convex surface of the rear lens mold;
  (h) casting a lens-forming fluid into the cavity; and
  (i) curing the lens-forming fluid within the cavity to form a lens having dimensions substantially identical to the cavity.
2. The method of claim 1, wherein the composition is adapted for providing a reactive chemical group on the polarized film to form a connecting bridge to the lens, and comprises a sol-gel component and a reactive monomer, wherein the sol-gel component comprises titanium isopropoxide

(TIP), or an ethyl acetate modified TIP, and wherein the reactive monomer comprises methacryloxypropyl trimethoxysilane.

3. The method of claim 1, wherein the polarized film is formed of polyvinylalcohol (PVA) or polyethylene terephthalate (PET).

4. The method of claim 1, wherein the hard coat layer is formed of a hard coat composition that comprises dipentaerythritol pentaacrylate (SR399), ethanol, IRGACURE® 907, and Byk-UV3500.

5. The method of claim 4, wherein the step of forming the hard coat layer is performed by spin-coating or spray coating the hard coat composition onto the concave surface of the front lens mold.

6. The method of claim 4, further comprising the step of depositing the hard coat composition onto the convex surface of the rear lens mold to form a hard coat layer thereon.

7. The method of claim 1, wherein the adhesive layer is formed of a composition that comprises about 100 parts SR150, 1.0 part triphenylphosphine and 1.0 part IRGACURE® 184.

8. The method of claim 1, wherein each of the front lens mold and the rear lens mold is formed by glass, plastic or metal.

9. A polarized lens fabricated according to the method of claim 1.

10. A method for manufacturing a polarized lens, comprising the steps of:
    (a) treating a polarized film with a composition to form a treated polarized film;
    (b) providing a front lens mold having a concave surface with a curvature;
    (c) spin-coating a hard coat composition onto the concave surface of the front lens mold to form a hard coat layer thereon;
    (d) forming a first adhesive layer on the hard coat layer;
    (e) placing the treated polarized film on the adhesive layer;
    (f) curing the adhesive layer with UV or visible light to bond the treated polarized film to the hard coat layer, thereby forming a polarized front lens mold; and
    (g) forming a polarized lens with the polarized front lens mold.

11. The method of claim 10, wherein the composition is adapted for providing a reactive chemical group on the polarized film to form a connecting bridge to the lens, and comprises a sol-gel component and a reactive monomer, wherein the sol-gel component comprises titanium isopropoxide (TIP), or an ethyl acetate modified TIP, and wherein the reactive monomer comprises methacryloxypropyl trimethoxysilane.

12. The method of claim 10, wherein the step of forming the polarized lens comprises the steps of:
    (a) forming a second adhesive layer on the treated polarized film of the polarized front lens mold;
    (b) placing a pre-formed lens on the second adhesive layer; and
    (c) curing the second adhesive layer with UV or visible light to bond the pre-formed lens to the polarized front lens mold, thereby forming a polarized lens.

13. The method of claim 12, wherein the first adhesive layer is formed of a first adhesive composition, and wherein the second adhesive layer is formed of a second adhesive composition that is identical to or different from the first adhesive composition.

14. The method of claim 10, wherein the step of forming the polarized lens comprises the steps of:
    (a) providing a rear lens mold having a convex surface with a curvature;
    (b) combining the polarized front lens mold with the rear lens mold to define a cavity between the treated polarized film and the convex surface of the rear lens mold;
    (c) casting a lens-forming fluid into the cavity; and
    (d) curing the lens-forming fluid within the cavity to form a lens having dimensions substantially identical to the cavity.

15. The method of claim 14, wherein the step of forming the polarized lens further comprises the step of forming a second adhesive layer between the lens and the treated polarized film.

16. A polarized lens fabricated according to the method of claim 10.

17. A method for manufacturing a polarized lens, comprising the steps of:
    (a) providing a front lens mold having a concave surface with a curvature;
    (b) spin-coating a hard coat composition onto the concave surface of the front lens mold to form a hard coat layer thereon;
    (c) forming a first adhesive layer on the hard coat layer;
    (d) placing a polarized film on the adhesive layer;
    (e) curing the adhesive layer with UV or visible light to bond the treated polarized film to the hard coat layer, thereby forming a polarized front lens mold; and
    (f) forming a polarized lens with the polarized front lens mold.

18. The method of claim 17, wherein the step of forming the polarized lens comprises the steps of:
    (a) forming a second adhesive layer on the polarized film of the polarized front lens mold;
    (b) placing a pre-formed lens on the second adhesive layer; and
    (c) curing the second adhesive layer with UV or visible light to bond the pre-formed lens to the polarized front lens mold, thereby forming a polarized lens.

19. The method of claim 18, wherein the first adhesive layer is formed of a first adhesive composition, and wherein the second adhesive layer is formed of a second adhesive composition that is identical to or different from the first adhesive composition.

20. The method of claim 17, wherein the step of forming the polarized lens comprises the steps of:
    (a) providing a rear lens mold having a convex surface with a curvature;
    (b) combining the polarized front lens mold with the rear lens mold to define a cavity between the polarized film and the convex surface of the rear lens mold;
    (c) casting a lens-forming fluid into the cavity; and
    (d) curing the lens-forming fluid within the cavity to form a lens having dimensions substantially identical to the cavity.

21. The method of claim 20, wherein the step of forming the polarized lens further comprises the step of forming a second adhesive layer between the lens and the treated polarized film.

22. The method of claim 17 wherein the polarized film is pre-treated by a physical or chemical process.

23. The method of claim 22 wherein the physical pre-treatment is UV radiation, plasma or corona discharge.

24. A polarized lens fabricated according to the method of claim 17.

25. The method of claim 1, wherein the polarized lens comprises a finished lens or a semi-finished lens.

26. The polarized lens of claim 9, comprising a finished lens or a semi-finished lens.

27. The method of claim 17, wherein the polarized lens comprises a finished lens or a semi-finished lens.

28. The polarized lens of claim 24, comprising a finished lens or a semi-finished lens.

* * * * *

UNITED STATES PATENT AND TRADEMARK OFFICE
CERTIFICATE OF CORRECTION

| | |
|---|---|
| PATENT NO. | : 7,942,523 B2 |
| APPLICATION NO. | : 12/236897 |
| DATED | : May 17, 2011 |
| INVENTOR(S) | : Kai Su et al. |

It is certified that error appears in the above-identified patent and that said Letters Patent is hereby corrected as shown below:

Column 1, Line 62: "lens" should read
--lenses--
Column 1, Line 67: "polarized lens must be manufactured" should read
--polarized lenses must be manufactured--

Column 9, Line 27: "less than 900 to 95°C" should read
--less than 90° to 95°C--

Column 13, Line 60: "PVA film to the 5°C. oven and leave it there overnight." should read
--PVA film to the 50°C oven and leave it there overnight.--

Page 1 of 1

Signed and Sealed this
Twelfth Day of July, 2011

David J. Kappos
*Director of the United States Patent and Trademark Office*

UNITED STATES PATENT AND TRADEMARK OFFICE
CERTIFICATE OF CORRECTION

Page 1 of 1

PATENT NO. : 7,942,523 B2
APPLICATION NO. : 12/236897
DATED : May 17, 2011
INVENTOR(S) : Kai Su et al.

It is certified that error appears in the above-identified patent and that said Letters Patent is hereby corrected as shown below:

In the Specification

Column 9:
Column 9, Line 42: "the treated polarized film" should read
--the polarized film--
Column 9, Line 44: "the treated polarized film" should read
--the polarized film--
Column 9, Line 52: "the treated polarized film" should read
--the polarized film--

In the Claims

Column 16:
Column 16, Line 27: "the treated polarized film" should read
--the polarized film--
Column 16, Line 58-59: "the treated polarized film" should read
--the polarized film--

Signed and Sealed this
Twenty-second Day of October, 2013

Teresa Stanek Rea
*Deputy Director of the United States Patent and Trademark Office*